(12) United States Patent
Lavoie et al.

(10) Patent No.: US 10,683,034 B2
(45) Date of Patent: Jun. 16, 2020

(54) VEHICLE REMOTE PARKING SYSTEMS AND METHODS

(71) Applicant: Ford Global Technologies, LLC, Dearborn, MI (US)

(72) Inventors: Erick Michael Lavoie, Dearborn, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 315 days.

(21) Appl. No.: 15/615,580

(22) Filed: Jun. 6, 2017

(65) Prior Publication Data

US 2018/0345851 A1 Dec. 6, 2018

(51) Int. Cl.
*B62D 15/02* (2006.01)
*B60Q 9/00* (2006.01)
*G06T 7/73* (2017.01)
*G01S 5/16* (2006.01)

(52) U.S. Cl.
CPC .......... *B62D 15/027* (2013.01); *B60Q 9/005* (2013.01); *B60Q 9/006* (2013.01); *G06T 7/74* (2017.01); *B60T 2201/10* (2013.01); *G01S 5/16* (2013.01); *G06T 2207/10004* (2013.01); *G06T 2207/30244* (2013.01)

(58) Field of Classification Search
USPC ........................................................... 701/41
See application file for complete search history.

(56) References Cited

U.S. PATENT DOCUMENTS

| | | | |
|---|---|---|---|
| 5,959,724 A * | 9/1999 | Izumi | G01S 11/12 356/3.14 |
| 6,275,754 B1 | 8/2001 | Shimizu | |
| 6,356,828 B1 | 3/2002 | Shimizu | |
| 6,452,617 B1 | 9/2002 | Bates | |
| 6,476,730 B2 | 11/2002 | Kakinami | |
| 6,477,260 B1 * | 11/2002 | Shimomura | H04N 13/239 382/106 |
| 6,657,555 B2 | 12/2003 | Shimizu | |
| 6,683,539 B2 | 1/2004 | Trajkovic | |

(Continued)

FOREIGN PATENT DOCUMENTS

CN 101929921 A 12/2010
CN 103818204 A 5/2014
(Continued)

OTHER PUBLICATIONS

US 9,772,406 B2, 09/2017, Liu (withdrawn)
(Continued)

*Primary Examiner* — Jean Paul Cass
(74) *Attorney, Agent, or Firm* — Frank Lollo; Eversheds Sutherland (US) LLP (57) ABSTRACT

Systems, methods, and computer-readable media are disclosed for determining a distance between a vehicle and a computing device during a remote parking operation. An example method includes receiving, by a computing device, a 3D model of a vehicle and vehicle inertial data. The method also includes capturing an image of the vehicle. The method further includes determining a distance between the computing device and the vehicle based on the image and the 3D model, and updating the distance based on the vehicle inertial data.

21 Claims, 4 Drawing Sheets

(56) References Cited

U.S. PATENT DOCUMENTS

| | | |
|---|---|---|
| 6,724,322 B2 | 4/2004 | Tang |
| 6,744,364 B2 | 6/2004 | Wathen |
| 6,768,420 B2 | 7/2004 | McCarthy |
| 6,801,855 B1 | 10/2004 | Walters |
| 6,850,844 B1 | 1/2005 | Walters |
| 6,850,148 B2 | 2/2005 | Masudaya |
| 6,927,685 B2 | 8/2005 | Wathen |
| 6,997,048 B2 | 2/2006 | Komatsu |
| 7,042,332 B2 | 5/2006 | Takamura |
| 7,123,167 B2 | 10/2006 | Staniszewski |
| 7,307,655 B1* | 12/2007 | Okamoto ............ G06K 9/00791 348/222.1 |
| 7,663,508 B2 | 2/2010 | Teshima |
| 7,737,866 B2 | 6/2010 | Wu |
| 7,813,844 B2 | 10/2010 | Gensler |
| 7,825,828 B2 | 11/2010 | Watanabe |
| 7,834,778 B2 | 11/2010 | Browne |
| 7,847,709 B2 | 12/2010 | McCall |
| 7,850,078 B2 | 12/2010 | Christenson |
| 7,924,483 B2* | 4/2011 | Smith ............... H01L 27/14621 358/514 |
| 8,035,503 B2 | 10/2011 | Partin |
| 8,054,169 B2 | 11/2011 | Bettecken |
| 8,098,146 B2 | 1/2012 | Petrucelli |
| 8,126,450 B2 | 2/2012 | Howarter |
| 8,164,628 B2 | 4/2012 | Stein et al. |
| 8,180,524 B2 | 5/2012 | Eguchi |
| 8,180,547 B2 | 5/2012 | Prasad |
| 8,224,313 B2 | 7/2012 | Howarter |
| 8,229,645 B2 | 7/2012 | Lee |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,552,856 B2 | 10/2013 | McRae |
| 8,587,681 B2 | 11/2013 | Guidash |
| 8,594,616 B2 | 11/2013 | Gusikhin |
| 8,599,043 B2 | 12/2013 | Kadowaki |
| 8,618,945 B2 | 12/2013 | Furuta |
| 8,645,015 B2 | 2/2014 | Oetiker |
| 8,655,551 B2 | 2/2014 | Danz |
| 8,692,773 B2 | 4/2014 | You |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,787,868 B2 | 7/2014 | Leblanc |
| 8,825,262 B2 | 9/2014 | Lee |
| 8,933,778 B2 | 1/2015 | Birkel |
| 8,957,786 B2 | 2/2015 | Stempnik |
| 8,994,548 B2 | 3/2015 | Gaboury |
| 8,995,914 B2 | 3/2015 | Nishidai |
| 9,008,860 B2 | 4/2015 | Waldock |
| 9,014,920 B1 | 4/2015 | Torres |
| 9,078,200 B2 | 7/2015 | Wuergler |
| 9,086,879 B2 | 7/2015 | Gautama |
| 9,141,503 B1 | 9/2015 | Chen |
| 9,147,065 B2 | 9/2015 | Lauer |
| 9,154,920 B2 | 10/2015 | O'Brien |
| 9,168,955 B2 | 10/2015 | Noh |
| 9,193,387 B2 | 11/2015 | Auer |
| 9,225,531 B2 | 12/2015 | Hachey |
| 9,230,439 B2 | 1/2016 | Boulay |
| 9,233,710 B2 | 1/2016 | Lavoie |
| 9,273,966 B2 | 3/2016 | Bartels |
| 9,275,208 B2 | 3/2016 | Protopapas |
| 9,283,960 B1 | 3/2016 | Lavoie |
| 9,286,803 B2 | 3/2016 | Tippelhofer |
| 9,302,675 B2 | 4/2016 | Schilling |
| 9,318,022 B2 | 4/2016 | Barth |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,454,251 B1 | 9/2016 | Guihot |
| 9,469,247 B2 | 10/2016 | Juneja |
| 9,493,187 B2 | 11/2016 | Pilutti |
| 9,506,774 B2 | 11/2016 | Shutko |
| 9,511,799 B2 | 12/2016 | Lavoie |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman |
| 9,656,690 B2 | 5/2017 | Shen |
| 9,666,040 B2 | 5/2017 | Flaherty |
| 9,688,306 B2 | 6/2017 | McClain |
| 9,701,280 B2 | 7/2017 | Schussmann |
| 9,712,977 B2 | 7/2017 | Tu |
| 9,715,816 B1 | 7/2017 | Adler |
| 9,725,069 B2 | 8/2017 | Krishnan |
| 9,731,714 B2 | 8/2017 | Kiriya |
| 9,731,764 B2 | 8/2017 | Baek |
| 9,754,173 B2 | 9/2017 | Kim |
| 9,809,218 B2 | 11/2017 | Elie |
| 9,811,085 B1 | 11/2017 | Hayes |
| 9,842,444 B2 | 12/2017 | Van Wiemeersch |
| 9,845,070 B2 | 12/2017 | Petel |
| 9,846,431 B2 | 12/2017 | Petel |
| 9,914,333 B2 | 3/2018 | Shank |
| 9,921,743 B2 | 3/2018 | Bryant |
| 9,946,255 B2 | 4/2018 | Matters |
| 9,959,763 B2 | 5/2018 | Miller |
| 9,971,130 B1* | 5/2018 | Lin ....................... G02B 3/0056 |
| 9,975,504 B2 | 5/2018 | Dalke |
| 10,019,001 B2 | 7/2018 | Dang Van Nhan |
| 10,032,276 B1* | 7/2018 | Liu .......................... G06T 7/246 |
| 10,040,482 B1 | 8/2018 | Jung |
| 10,043,076 B1* | 8/2018 | Zhang ................. G06K 9/4671 |
| 10,131,347 B2 | 11/2018 | Kim |
| 10,192,113 B1* | 1/2019 | Liu ...................... G06K 9/00664 |
| 10,246,055 B2 | 4/2019 | Farges |
| 10,268,341 B2 | 4/2019 | Kocienda |
| 2003/0060972 A1 | 3/2003 | Kakinami |
| 2003/0098792 A1 | 5/2003 | Edwards |
| 2003/0133027 A1* | 7/2003 | Itoh ...................... H04N 5/2171 348/246 |
| 2005/0030156 A1 | 2/2005 | Alfonso |
| 2005/0068450 A1* | 3/2005 | Steinberg ............... G06K 9/346 348/335 |
| 2005/0099275 A1 | 5/2005 | Kamdar |
| 2006/0010961 A1 | 1/2006 | Gibson |
| 2006/0227010 A1 | 10/2006 | Berstis |
| 2006/0235590 A1 | 10/2006 | Bolourchi |
| 2007/0230944 A1 | 10/2007 | Georgiev |
| 2008/0027591 A1 | 1/2008 | Lenser |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 | 12/2008 | Ando |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |
| 2009/0128315 A1 | 5/2009 | Griesser |
| 2009/0146813 A1 | 6/2009 | Nuno |
| 2009/0174574 A1 | 7/2009 | Endo |
| 2009/0241031 A1 | 9/2009 | Gamaley |
| 2009/0289813 A1 | 11/2009 | Kwiecinski |
| 2009/0309970 A1 | 12/2009 | Ishii |
| 2009/0313095 A1 | 12/2009 | Hurpin |
| 2010/0025942 A1 | 2/2010 | Mangaroo |
| 2010/0061564 A1 | 3/2010 | Clemow |
| 2010/0114471 A1 | 5/2010 | Sugiyama |
| 2010/0114488 A1 | 5/2010 | Khamharn |

(56) References Cited

U.S. PATENT DOCUMENTS

| | | |
|---|---|---|
| 2010/0136944 A1 | 6/2010 | Taylor |
| 2010/0152972 A1 | 6/2010 | Attard |
| 2010/0156672 A1 | 6/2010 | Yoo |
| 2010/0245277 A1 | 9/2010 | Nakao |
| 2010/0259420 A1 | 10/2010 | Von Rehyer |
| 2011/0071725 A1 | 3/2011 | Kleve |
| 2011/0082613 A1 | 4/2011 | Oetiker |
| 2011/0190972 A1 | 8/2011 | Timmons |
| 2011/0205088 A1 | 8/2011 | Baker |
| 2011/0253463 A1 | 10/2011 | Smith |
| 2011/0309922 A1 | 12/2011 | Ghabra |
| 2012/0007741 A1 | 1/2012 | Laffey |
| 2012/0072067 A1 | 3/2012 | Jecker |
| 2012/0083960 A1 | 4/2012 | Zhu |
| 2012/0173018 A1* | 7/2012 | Allen .................. G05D 1/0248 700/245 |
| 2012/0173080 A1 | 7/2012 | Cluff |
| 2012/0176332 A1 | 7/2012 | Fujibayashi |
| 2012/0271500 A1 | 10/2012 | Tsimhoni |
| 2012/0303258 A1 | 11/2012 | Pampus |
| 2012/0323643 A1 | 12/2012 | Volz |
| 2012/0323700 A1 | 12/2012 | Aleksandrovich |
| 2013/0021171 A1 | 1/2013 | Hsu |
| 2013/0024202 A1 | 1/2013 | Harris |
| 2013/0043989 A1 | 2/2013 | Niemz |
| 2013/0073119 A1 | 3/2013 | Huger |
| 2013/0109342 A1 | 5/2013 | Welch |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar |
| 2013/0211623 A1 | 8/2013 | Thompson |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang |
| 2014/0052323 A1* | 2/2014 | Reichel .................. G07C 5/085 701/23 |
| 2014/0095994 A1 | 4/2014 | Kim |
| 2014/0096051 A1 | 4/2014 | Boblett |
| 2014/0121930 A1 | 5/2014 | Allexi |
| 2014/0136414 A1* | 5/2014 | Abhyanker ............ G06Q 50/28 705/44 |
| 2014/0147032 A1 | 5/2014 | Yous |
| 2014/0156107 A1 | 6/2014 | Karasawa |
| 2014/0188339 A1 | 7/2014 | Moon |
| 2014/0222252 A1 | 8/2014 | Matters |
| 2014/0240502 A1 | 8/2014 | Strauss |
| 2014/0282931 A1 | 9/2014 | Protopapas |
| 2014/0297120 A1 | 10/2014 | Cotgrove |
| 2014/0300504 A1 | 10/2014 | Shaffer |
| 2014/0303839 A1 | 10/2014 | Filev |
| 2014/0320318 A1 | 10/2014 | Victor |
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1 | 12/2014 | You |
| 2014/0365126 A1 | 12/2014 | Vulcano |
| 2015/0022468 A1 | 1/2015 | Cha |
| 2015/0039173 A1 | 2/2015 | Beaurepaire |
| 2015/0039224 A1 | 2/2015 | Tuukkanen |
| 2015/0048927 A1 | 2/2015 | Simmons |
| 2015/0066545 A1 | 3/2015 | Kotecha |
| 2015/0077522 A1 | 3/2015 | Suzuki |
| 2015/0088360 A1 | 3/2015 | Bonnet |
| 2015/0091741 A1 | 4/2015 | Stefik |
| 2015/0109116 A1 | 4/2015 | Grimm |
| 2015/0116079 A1 | 4/2015 | Mishra |
| 2015/0123818 A1 | 5/2015 | Sellschopp |
| 2015/0127208 A1 | 5/2015 | Jecker |
| 2015/0149265 A1 | 5/2015 | Huntzicker |
| 2015/0151789 A1 | 6/2015 | Lee |
| 2015/0153178 A1 | 6/2015 | Koo |
| 2015/0161890 A1 | 6/2015 | Huntzicker |
| 2015/0163649 A1 | 6/2015 | Chen |
| 2015/0197278 A1 | 7/2015 | Boos |
| 2015/0203111 A1 | 7/2015 | Bonnet |
| 2015/0203156 A1 | 7/2015 | Hafner |
| 2015/0210317 A1 | 7/2015 | Hafner |
| 2015/0217693 A1 | 8/2015 | Pliefke |
| 2015/0219464 A1 | 8/2015 | Beaurepaire |
| 2015/0220791 A1 | 8/2015 | Wu |
| 2015/0226146 A1 | 8/2015 | Elwart |
| 2015/0274016 A1 | 10/2015 | Kinoshita |
| 2015/0286340 A1 | 10/2015 | Send |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0365401 A1 | 12/2015 | Brown |
| 2015/0371541 A1 | 12/2015 | Korman |
| 2015/0375741 A1 | 12/2015 | Kiriya |
| 2015/0375742 A1 | 12/2015 | Gebert |
| 2016/0012653 A1 | 1/2016 | Soroka |
| 2016/0012726 A1 | 1/2016 | Wang |
| 2016/0018821 A1 | 1/2016 | Akita |
| 2016/0055749 A1 | 2/2016 | Nicoll |
| 2016/0153778 A1 | 2/2016 | Singh |
| 2016/0062354 A1 | 3/2016 | Li |
| 2016/0068158 A1 | 3/2016 | Elwart |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1 | 5/2016 | Ohshima |
| 2016/0152263 A1 | 6/2016 | Singh |
| 2016/0170494 A1 | 6/2016 | Bonnet |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0224025 A1 | 8/2016 | Petel |
| 2016/0229452 A1 | 8/2016 | Lavoie |
| 2016/0236680 A1 | 8/2016 | Lavoie |
| 2016/0249294 A1 | 8/2016 | Lee |
| 2016/0257304 A1 | 9/2016 | Lavoie |
| 2016/0272244 A1 | 9/2016 | Imai |
| 2016/0282442 A1 | 9/2016 | O'Mahony |
| 2016/0284217 A1 | 9/2016 | Lee |
| 2016/0288657 A1 | 10/2016 | Tokura |
| 2016/0300417 A1 | 10/2016 | Hatton |
| 2016/0304087 A1 | 10/2016 | Noh |
| 2016/0304088 A1 | 10/2016 | Barth |
| 2016/0349362 A1 | 10/2016 | Rohr |
| 2016/0321445 A1 | 11/2016 | Turgeman |
| 2016/0321926 A1 | 11/2016 | Mayer |
| 2016/0334797 A1 | 11/2016 | Ross |
| 2016/0347280 A1 | 12/2016 | Daman |
| 2016/0355125 A1 | 12/2016 | Herbert |
| 2016/0357354 A1 | 12/2016 | Chen |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang |
| 2017/0001650 A1 | 1/2017 | Park |
| 2017/0008563 A1 | 1/2017 | Popken |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0097504 A1 | 4/2017 | Takamatsu |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |

(56) References Cited

U.S. PATENT DOCUMENTS

| | | |
|---|---|---|
| 2017/0144656 A1 | 5/2017 | Kim |
| 2017/0147995 A1 | 5/2017 | Kalimi |
| 2017/0168479 A1 | 6/2017 | Dang |
| 2017/0192428 A1 | 7/2017 | Vogt |
| 2017/0200369 A1 | 7/2017 | Miller |
| 2017/0203763 A1 | 7/2017 | Yamada |
| 2017/0208438 A1 | 7/2017 | Dickow |
| 2017/0297385 A1 | 10/2017 | Kim |
| 2017/0297620 A1 | 10/2017 | Lavoie |
| 2017/0301241 A1 | 10/2017 | Urhahne |
| 2017/0308075 A1 | 10/2017 | Whitaker |
| 2017/0336788 A1 | 11/2017 | Iagnemma |
| 2017/0357317 A1 | 12/2017 | Chaudhri |
| 2017/0371514 A1 | 12/2017 | Cullin |
| 2018/0015878 A1 | 1/2018 | McNew |
| 2018/0024559 A1 | 1/2018 | Seo |
| 2018/0029591 A1 | 2/2018 | Lavoie |
| 2018/0029641 A1 | 2/2018 | Solar |
| 2018/0039264 A1 | 2/2018 | Messner |
| 2018/0043884 A1 | 2/2018 | Johnson |
| 2018/0056939 A1 | 3/2018 | van Roermund |
| 2018/0056989 A1 | 3/2018 | Donald |
| 2018/0082588 A1 | 3/2018 | Hoffman, Jr. |
| 2018/0088330 A1* | 3/2018 | Giannuzzi ............ G02B 27/017 |
| 2018/0093663 A1 | 4/2018 | Kim |
| 2018/0105165 A1 | 4/2018 | Alarcon |
| 2018/0105167 A1 | 4/2018 | Kim |
| 2018/0148094 A1 | 5/2018 | Mukaiyama |
| 2018/0174460 A1 | 6/2018 | Jung |
| 2018/0189971 A1* | 7/2018 | Hildreth ................ H04N 5/232 |
| 2018/0194344 A1 | 7/2018 | Wang |
| 2018/0196963 A1 | 7/2018 | Bandiwdekar |
| 2018/0224863 A1 | 8/2018 | Fu |
| 2018/0236957 A1 | 8/2018 | Min |
| 2018/0284802 A1* | 10/2018 | Tsai ..................... H04N 5/2353 |
| 2018/0286072 A1* | 10/2018 | Tsai ..................... G01C 21/206 |
| 2018/0339654 A1 | 11/2018 | Kim |
| 2018/0345851 A1* | 12/2018 | Lavoie .................. B60Q 9/005 |
| 2018/0364731 A1* | 12/2018 | Liu ............................ G06T 1/20 |
| 2019/0005445 A1 | 1/2019 | Bahrainwala |
| 2019/0042003 A1 | 2/2019 | Parazynski |
| 2019/0066503 A1 | 2/2019 | Li |
| 2019/0103027 A1 | 4/2019 | Wheeler |
| 2019/0137990 A1 | 5/2019 | Golgiri |

FOREIGN PATENT DOCUMENTS

| | | |
|---|---|---|
| CN | 104183153 A | 12/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009024083 A1 | 7/2010 |
| DE | 102016224529 A1 | 3/2011 |
| DE | 102016226008 A1 | 3/2011 |
| DE | 102009060169 A1 | 6/2013 |
| DE | 102011080148 A1 | 7/2013 |
| DE | 102012200725 A1 | 9/2013 |
| DE | 102009051055 A1 | 10/2013 |
| DE | 102010034129 B4 | 10/2013 |
| DE | 102011122421 A1 | 6/2014 |
| DE | 102012008858 A1 | 6/2014 |
| DE | 102013016342 A1 | 1/2015 |
| DE | 102013019904 A1 | 2/2015 |
| DE | 102012215218 A1 | 4/2015 |
| DE | 102012222972 A1 | 5/2015 |
| DE | 102013004214 A1 | 5/2015 |
| DE | 102013019771 A1 | 12/2015 |
| DE | 102013213064 A1 | 2/2016 |
| DE | 102014007915 A1 | 2/2016 |
| DE | 102014011802 A1 | 2/2016 |
| DE | 102014009077 A1 | 4/2016 |
| DE | 102014226458 A1 | 6/2016 |
| DE | 102014011864 A1 | 12/2016 |
| DE | 102014015655 A1 | 5/2017 |
| DE | 102014111570 A1 | 6/2017 |
| DE | 102016214433 A1 | 6/2017 |
| DE | 102015209976 A1 | 7/2017 |
| DE | 102015221224 A1 | 12/2017 |
| DE | 102016011916 A1 | 2/2018 |
| DE | 102016125282 A1 | 6/2018 |
| DE | 102016211021 A1 | 6/2018 |
| EP | 2653367 A1 | 6/2000 |
| EP | 2768718 B1 | 6/2011 |
| EP | 2289768 A2 | 10/2013 |
| EP | 2620351 B1 | 12/2015 |
| EP | 2295281 A1 | 3/2016 |
| EP | 2135788 B1 | 6/2016 |
| FR | 3021798 A1 | 12/2012 |
| GB | 2534471 A | 10/2000 |
| GB | 2344481 A | 12/2012 |
| GB | 2497836 A | 9/2014 |
| GB | 2481324 A | 3/2015 |
| GB | 2517835 A | 5/2016 |
| GB | 2491720 A | 7/2016 |
| JP | 5586450 B2 | 5/2004 |
| JP | 5918683 B2 | 10/2004 |
| JP | 2000293797 A | 7/2005 |
| JP | 2004142543 A | 4/2009 |
| JP | 2016119032 A | 4/2009 |
| JP | 2018052188 A | 1/2010 |
| JP | 2004287884 A | 7/2014 |
| JP | 2005193742 A | 7/2014 |
| JP | 2009090850 A | 6/2016 |
| JP | 2014134082 A | 7/2016 |
| JP | 2014125196 A | 4/2018 |
| KR | 20130106005 A | 6/2006 |
| KR | 20160039460 A | 5/2008 |
| KR | 20160051993 A | 1/2010 |
| KR | 101641267 B | 9/2013 |
| KR | 20090040024 A | 4/2016 |
| KR | 20100006714 A | 5/2016 |
| WO | WO 2017/112444 A1 | 12/2010 |
| WO | WO 2017/118510 A1 | 6/2011 |
| WO | WO 2006/064544 A1 | 11/2011 |
| WO | WO 2017/125514 A1 | 1/2013 |
| WO | WO 2008/055567 A1 | 4/2013 |
| WO | WO 2010/006981 A1 | 8/2013 |
| WO | WO 2014103492 A1 | 7/2014 |
| WO | WO 2015068032 A1 | 5/2015 |
| WO | WO 2013/123813 A1 | 12/2015 |
| WO | WO 2014/103492 A1 | 3/2016 |
| WO | WO 2015/068032 A1 | 8/2016 |
| WO | WO 2015/193058 A1 | 9/2016 |
| WO | WO 2016/046269 A1 | 4/2017 |
| WO | WO 2016/128200 A1 | 5/2017 |
| WO | WO 2016/134822 A1 | 6/2017 |
| WO | WO 2017/062448 A1 | 6/2017 |
| WO | WO 2017/073159 A1 | 6/2017 |
| WO | WO 2017/096307 A1 | 6/2017 |
| WO | WO 2017/096728 A1 | 7/2017 |
| WO | WO 2017/097942 A1 | 7/2017 |

OTHER PUBLICATIONS

Vehicle'a Orientation Measurement Method by Single-Camera Image Using Known-Shaped Planar Object, Nozomu Araki, Takao Sato, Yasuo Konishi and Hiroyuki Ishigaki, 2010.

(56) References Cited

OTHER PUBLICATIONS

Alberto Broggi and Elena Cardarelli, Vehicle Detection for Autonomous Parking Using a Soft-Cascade ADA Boost Classifier, Jun. 8, 2014.
Al-Sherbaz, Ali et al., Hybridisation of GNSS with other wireless/sensors technologies on board smartphones to offer seamless outdoors-indoors positioning for LBS applications, Apr. 2016, 3 pages.
Automatically Into the Parking Space—https://www.mercedes-benz.com/en/mercedes-benz/next/automation/automatically-into-the-parking-space/; Oct. 27, 2014.
Bill Howard, Bosch's View of the Future Car: Truly Keyless Entry, Haptic Feedback, Smart Parking, Cybersecurity, Jan. 9, 2017, 8 Pages.
ChargeItSpot Locations, Find a Phone Charging Station Near You, retrieved at https://chargeitspot.com/locations/ on Nov. 28, 2017.
Core System Requirements Specification (SyRS), Jun. 30, 2011, Research and Innovative Technology Administration.
Daimler AG, Remote Parking Pilot, Mar. 2016 (3 Pages).
Jingbin Liu, IParking: An Intelligent Indoor Location-Based Smartphone Parking Service, Oct. 31, 2012, 15 pages.
Land Rover develops a smartphone remote control for its SUVs, James Vincent, Jun. 18, 2015.
Land Rover, Land Rover Remote Control via Iphone RC Range Rover Sport Showcase—Autogefühl, Retrieved from https://www.youtube.com/watch?v=4ZaaYNaEFio (at 43 seconds and 1 minute 42 seconds), Sep. 16, 2015.
Perpendicular Parking—https://prezi.com/toqmfyxriksl/perpendicular-parking/.
SafeCharge, Secure Cell Phone Charging Stations & Lockers, retrieved at https://www.thesafecharge.com on Nov. 28, 2017.
Search Report dated Jan. 19, 2018 for GB Patent Application No. 1711988.4 (3 pages).
Search Report dated Jul. 11, 2017 for GB Patent Application No. 1700447.4 (3 Pages).
Search Report dated May 21, 2018 for Great Britain Patent Application No. GB 1800277.4 (5 Pages).
Search Report dated Nov. 22, 2018 for GB Patent Application No. GB 1809829.3 (6 pages).
Search Report dated Nov. 27, 2018 for GB Patent Application No. GB 1809112.4 (3 pages).
Search Report dated Nov. 28, 2017, for GB Patent Application No. GB 1710916.6 (4 Pages).
Search Report dated Nov. 28, 2018 for GB Patent Application No. GB 1809842.6 (5 pages).
Search Report dated Oct. 10, 2018 for GB Patent Application No. 1806499.8 (4 pages).
Tesla Model S Owner's Manual v2018.44. Oct. 29, 2018.
Vehicle's Orientation Measurement Method by Single-Camera Image Using Known-Shaped Planar Object, Nozomu Araki, Takao Sato, Yasuo Konishi and Hiroyuki Ishigaki, 2010.

\* cited by examiner

VEHICLE REMOTE PARKING SYSTEMS AND METHODS

TECHNICAL FIELD

The present disclosure generally relates to vehicle remote parking assistance, and, more specifically, systems and methods for accurately determining a distance between a vehicle and a user device while remote parking is in progress.

BACKGROUND

Modern vehicles may include the ability to remotely drive themselves with no or only minor control instruction from the user. Some vehicle may even be able to park themselves while an owner or driver watches from outside the vehicle and provides no or minimal motion control instruction. In these instances, the driver may initiate the remote parking operation from a handheld computing device in communication with the vehicle. The computing device may thus be able to control one or more aspects of the vehicle remotely.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for determining a distance between a vehicle and a user device while remote parking is in progress. An example disclosed system includes a vehicle configured to transmit a 3D model of the vehicle and vehicle inertial data, and a computing device. The computing device is configured to receive the 3D model and inertial data, capture an image of the vehicle, determine a distance between the computing device and vehicle based on the image and the 3D model, and update the distance based on the vehicle inertial data.

An example disclosed method includes receiving, by a computing device, a 3D model of a vehicle and vehicle inertial data. The method also includes capturing an image of the vehicle. The method further includes determining a distance between the computing device and the vehicle based on the image and the 3D model. And the method further includes updating the distance based on the vehicle inertial data.

An example disclosed non-transitory computer-readable medium has instructions stored thereon that, when executed, cause performance of a set of acts. The set of acts includes receiving, by a computing device, a 3D model of a vehicle and vehicle inertial data. The set of acts also includes capturing an image of the vehicle. The set of acts further includes determining a distance between the computing device and the vehicle based on the image and the 3D model. And the set of acts still further includes updating the distance based on the vehicle inertial data.

A fourth example may include means for receiving a 3D model of a vehicle and vehicle inertial data, means for capturing an image of the vehicle, means for determining a distance between the computing device and the vehicle based on the image and the 3D model, and means for updating the distance based on the vehicle inertial data.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, embodiments herein are directed to system and methods for determining an accurate distance between a vehicle and a remote computing device. The remote computing device may be used to control the vehicle in a remote parking assistance mode.

Some modern vehicle may include an ability to automatically steer, drive, park, or otherwise control themselves. These vehicles may make use of one or more onboard sensors to receive data, process it, and take appropriate action. These vehicles may include communications systems and devices configured to allow the vehicle to communicate with one or more internal or external devices, systems, or networks.

In some cases, a given vehicle may include a remote parking assistance feature. This feature may allow a driver to exit the vehicle, select the remote parking feature, and watch as the vehicle parks itself in a garage or other parking location while providing minimal action to direct ongoing motion or the vehicle may perform the action in a fully autonomous manner.

Some states, countries, or other jurisdictions may require that a driver be within a threshold distance from the vehicle in order to allow this remote parking feature to take place. For instance, a regulation or law may require a driver to be within 10 meters of the vehicle during operation of the remote parking feature, and may require that the vehicle stop if the driver is too far away.

Some techniques for determining the distance between the driver and the vehicle may include using GPS, Bluetooth®, or one or more other similar techniques. But these techniques may have limited precision, limited accuracy, or many not function in some areas (e.g., GPS may not function within an underground parking structure), and/or can be spoofed or otherwise manipulated.

Embodiments of the present disclosure are directed to methods, systems, devices, and other mechanisms for determining a distance between a vehicle and a computing device (e.g., the driver of the vehicle) by making use of a camera, a 3D model of the vehicle, and one or more inertial sensors of the vehicle. These embodiments may enable a more accurate, precise, and robust distance measurement, which will work in any location or environment, and that can be reliably updated as the vehicle moves.

An example method may be performed by a computing device, which may be a handheld computing device such as a smart phone or tablet computer. The method may include receiving a 3D model of the vehicle, as well as vehicle inertial data. The 3D model may be generated and/or stored by the vehicle, and may be transmitted to the computing device via one or more communications protocols. Alternatively, the computing device may receive the 3D model from one or more other computing devices, such as a server or cloud storage device on which the 3D model is stored. As another example, the computing device may have a stored 3D model in a memory of the computing device. Further, the computing device may receive the vehicle inertial data from the vehicle, and may continue to receive data as the vehicle moves.

The example method may also include capturing an image of the vehicle. The image may be captured by a camera of the computing device. In some examples, a user may initiate a remote parking feature on his or her handheld device, and a camera application or function may responsively activate. The user may aim the camera at the vehicle, in order to capture images and/or video of the vehicle.

The example method may then include determining a distance based on the captured image and the received 3D model. In some examples, determining the distance may include searching the 3D model for a view that matches, or is within a matching threshold of, the captured image. This may include sectioning or otherwise breaking the 3D model into 2D images, which can then be compared to the captured image. Searching the 3D model may further include applying one or more filters or other techniques to narrow down the scope of the search. For instance, the method may include extracting one or more vehicle features from the image, and searching the 3D model for the extracted features. In another example, the method may include determining a course location of the computing device relative to the vehicle (or alternatively a course relative location, such as north, east, south, or west) and narrowing the search of the 3D model based on the coarse location.

When a match is found, the computing device may be able to determine the distance based on the match. For instance, a size of one or more features of the vehicle in the image may be matched to the 3D model, such as a distance from the top of the car to the bottom, or between front and rear wheels, and a distance may correspond to the size. In addition or alternatively, the computing device may include information related to a focal length of the camera used to capture the image. The focal length may correspond to a distance, which can be used to determine the distance between the camera and the vehicle.

The method may also include applying one or more filters, such as lighting filters, to the 3D model to assist in performing the search. The filer(s) may be applied to the 3D model in order to enable a greater likelihood or greater matching threshold, such as by mirroring a light source present in the image but not in the 3D model, mirroring one or more weather conditions (e.g., overcast, bright sun, etc.) and changing one or more lighting conditions due to the presence of one or more buildings, the time of day, the geographic location, or other factors that may affect the image or 3D model.

After a match is determined above a threshold, and a distance is subsequently determined, the example method may include updating the distance based on vehicle inertial data. The vehicle inertial data may include data received from one or more vehicle sensors, such as speed sensors, accelerometers, gyroscopes, position sensors, GPS, and more. These sensors may detect changes that occur to the vehicle as the remote parking operation occurs, which may be processed and/or translated into changes in vehicle position. The changes in vehicle position may be transmitted to the computing device, which may then responsively update the distance between the vehicle and the computing device.

In addition or alternatively, the computing device may continue to capture images of the vehicle, and may update the distance based on continued searching, matching, and distance calculation. This continued distance calculation based on the captured images may be compared with the vehicle inertial data and/or location information determined therefrom, in order to provide two mechanisms for determining the distance, such that more precise and accurate distance information can be determined.

Figure 1:
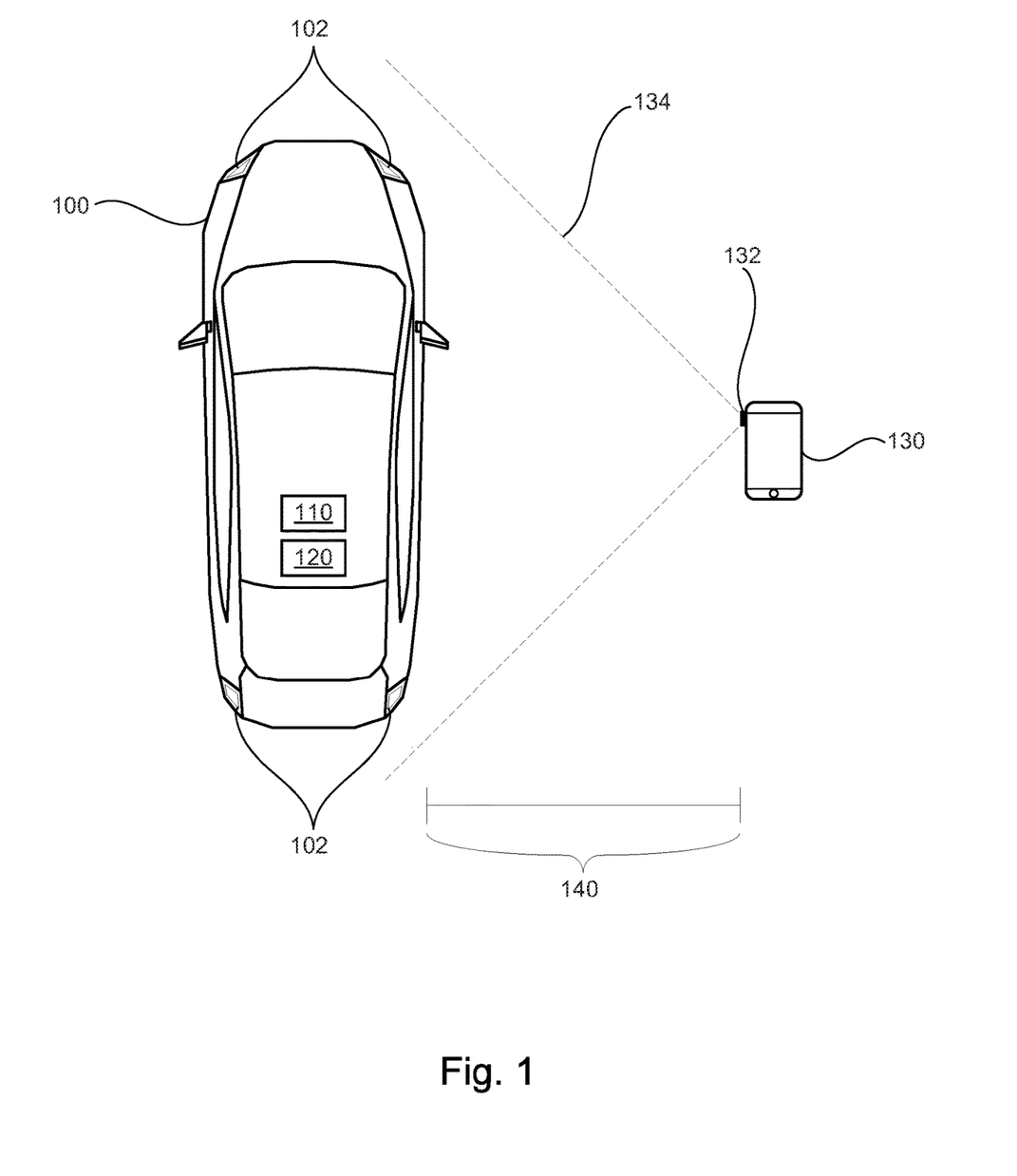
FIG. 1 illustrates an example vehicle and computing device according to embodiments of the present disclosure.
Figure 2A:
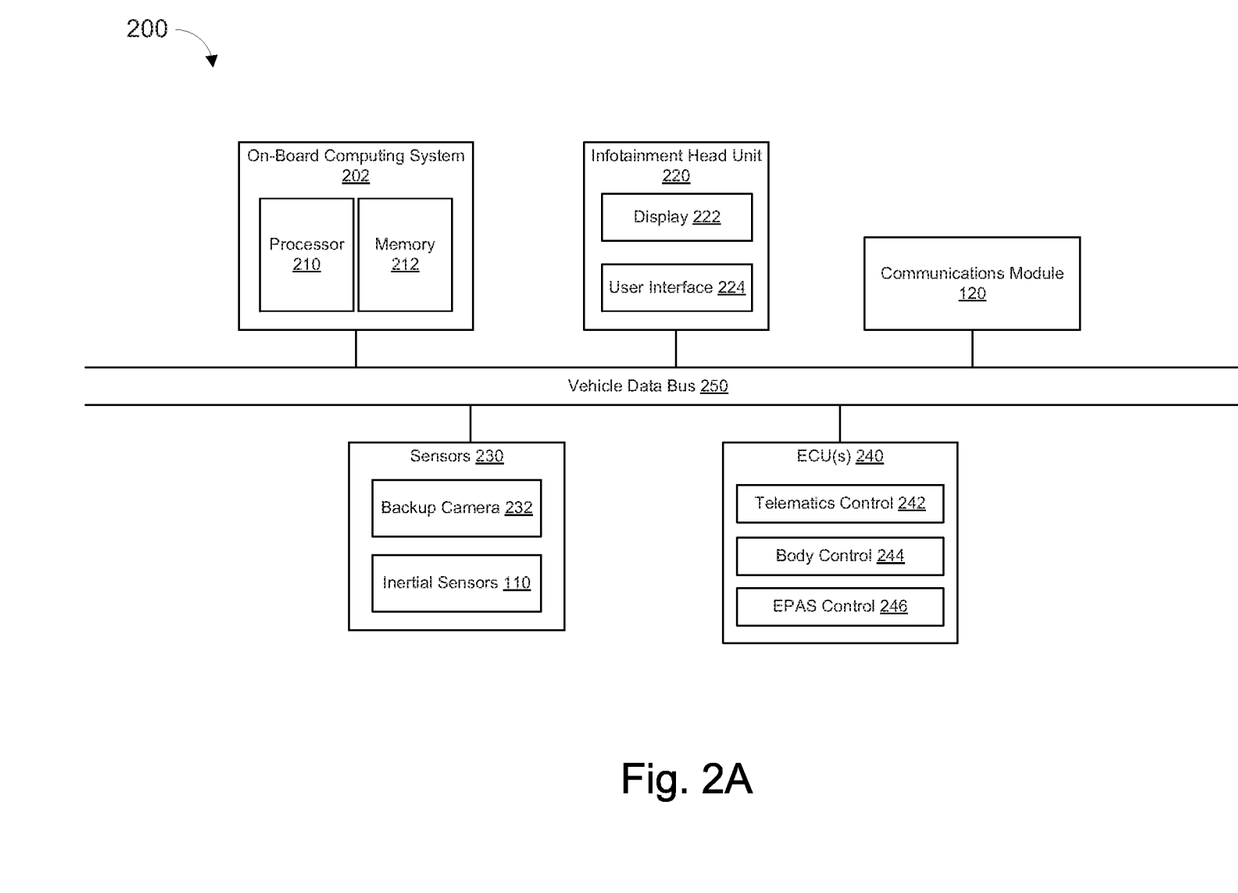
FIG. 2A illustrates an example block diagram of electronic components of the vehicle of FIG. 1.

FIG. 1 illustrates an example system involving a vehicle 100 and a computing device 130. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 includes parts related to mobility, such as a powertrain with an engine, a transmission, a suspension, a driveshaft, and/or wheels, etc. In the illustrated example, vehicle 100 may include one or more electronic components (described below with respect to FIG. 2).

As shown in FIG. 1, vehicle 100 may include one or more inertial sensors 110 and a communications module 120. Inertial sensors 110 may be configured to detect and measure one or more vehicle characteristics, such as vehicle speed, heading, orientation with respect to one or more external objects, and pitch, roll, or other angles with respect to the ground. As such, the sensors 110 may include one or more accelerometers, gyroscopes, wheel speed sensors, torque sensors, RADAR, LIDAR, and/or one or more other sensors configured to detect various metrics regarding vehicle 100. The sensor data may be used to match a captured image with a 2D subset of a 3D model of the vehicle, which can then be used to determine a distance between the vehicle and a computing device. The sensor data may also be used to update a determination of the distance. For instance, a processor of the vehicle may receive the sensor data, determine a movement of the vehicle, and transmit an indication of the movement to computing device 130. Computing device 130 may then update a determined distance based on the received indication.

Communication module 120 may be configured to transmit data to and/or receive data from computing device 130. The transmitted data may include a 3D model of vehicle 100, inertial sensor data from the inertial sensors 110, and other information.

Vehicle 100 may also include one or more features, such as front and rear lights 102. Vehicle 100 may also include one or more other features, such as a height from the top of the vehicle to the ground, a distance from a front end to a back end, the size of one or more windows, the position of reflective paint, tape, patches, plastic, or other material on the vehicle, and a positioning of the side view mirrors, to name a few.

Computing device 130 may be any handheld, portable, or other device configured to perform one or more actions described herein. Computing device 130 may also be a wearable device with a camera, and/or computing device 130 may consist of a combination of devices such as a phone paired with a wearable camera, or a watch with a camera paired to a phone. For the purposes of this invention, it is assumed all parts of a multi-piece computing device 130 are in possession of the user in hand or as a wearable. In FIG. 1, computing device 130 is shown as a smart phone, having a camera with a field of view 134. In some examples, computing device 130 may have a detachable lens 132 or a remote camera and lens linked to the phone.

FIG. 1 also illustrates a distance 140 between vehicle 100 and computing device 130. Distance 140 may be determined based on a 3D model of vehicle 100 and an image captured by computing device 130, as described herein.

FIG. 2A illustrates an example block diagram 200 showing electronic components of vehicle 100, according to some embodiments. In the illustrated example, the electronic components 200 include an on-board computing system 202, an infotainment head unit 220, a communications module 120, sensors 230, electronic control unit(s) 240, and vehicle data bus 250.

The on-board computing system 202 may include a microcontroller unit, controller or processor 210 and memory 212. The processor 210 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 212 includes multiple kinds of memory, particularly volatile memory and non-volatile memory.

The memory 212 may be a non-transitory computer-readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer-readable medium, and/or within the processor 210 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display 222, and user interface 224, to receive input from and display information for the user(s). The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor with on-board computing system 202. Additionally, the infotainment head unit 220 may display the infotainment system on, for example, a center console display of vehicle 100.

Communications module 120 may include wired or wireless network interfaces to enable communication with one or more internal or external systems, devices, or networks. Communications module 230 may also include hardware (e.g., processors, memory, storage, etc.) and software to control the wired or wireless network interfaces. In the illustrated example, communications module 120 may include a Bluetooth® module, a GPS receiver, a dedicated short range communication (DSRC) module, an Ultra-Wide Band (UWB) communications module, a WLAN module, and/or a cellular modem, all electrically coupled to one or more respective antennas.

The cellular modem may include controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); and Wireless Gigabit (IEEE 802.11ad), etc.). The WLAN module may include one or more controllers for wireless local area networks such as a Wi-FI® controller (including IEEE 802.11 a/b/g/n/ac or others), a Bluetooth® controller (based on the Bluetooth® Core Specification maintained by the Bluetooth® Special Interest Group), and/or a ZigBee® controller (IEEE 802.15.4), and/or a Near Field Communication (NFC) controller, etc. Further, the internal and/or external network(s) may be public networks, such as the Internet; a private network, such as an intranet; or combinations thereof, and may utilize a variety of networking protocols now available or later developed including, but not limited to, TCP/IP-based networking protocols.

Communications module 230 may also include a wired or wireless interface to enable direct communication with an electronic device (such as computing device 130). An example DSRC module may include radio(s) and software to broadcast messages and to establish direct connections between vehicles and between vehicles and one or more other devices or systems. DSRC is a wireless communication protocol or system, mainly meant for transportation, operating in a 5.9 GHz spectrum band.

Sensors 230 may be arranged in and around vehicle 100 in any suitable fashion. Sensors 230 may include backup camera 232, and one or more inertial sensors 110 such as those described above. In some examples, backup camera 232 and/or one or more of a RADAR and/or LIDAR may be used to determine a speed and heading of vehicle 100 with respect to an external object, such as nearby cars or structures. This may assist in determining changes in a distance between vehicle 100 and computing device 130.

Inertial sensors 110 may be configured to detect a location, speed, and heading of vehicle 100, as well as changes in the location, speed, and heading. Inertial sensors 110 may thus include one or more accelerometers, gyroscopes, wheel speed sensors, or more. Other sensors are possible as well, and each sensor may be electrically coupled to onboard computing system 202, such that information can be transmitted and received from computing device 130.

The ECUs 240 may monitor and control subsystems of vehicle 100. ECUs 240 may communicate and exchange information via vehicle data bus 250. Additionally, ECUs 240 may communicate properties (such as, status of the ECU 240, sensor readings, control state, error and diagnostic codes, etc.) to and/or receive requests from other ECUs 240. Some vehicles 100 may have seventy or more ECUs 240 located in various locations around the vehicle 100 communicatively coupled by vehicle data bus 250. ECUs 240 may be discrete sets of electronics that include their own circuit(s) (such as integrated circuits, microprocessors, memory, storage, etc.) and firmware, sensors, actuators, and/or mounting hardware. In the illustrated example, ECUs 240 may include the telematics control unit 242, the body control unit 244, and the electronic power assisted steering (EPAS) control unit 246.

The telematics control unit 242 may control tracking of the vehicle 100, for example, using data received by a GPS receiver, communication module 230, and/or one or more sensors 130. The body control unit 244 may control various subsystems of the vehicle 100. For example, the body control unit 244 may control a trunk latch, windows, power locks, power moon roof control, an immobilizer system, and/or power mirrors, etc. The EPAS control unit may control the vehicle steering, and may detect information about a vehicle position or heading and communicate that information to on-board computing system 202.

Vehicle data bus 250 may include one or more data buses, in conjunction with a gateway module, that communicatively couple the on-board computing system 202, infotainment head unit 220, communications module 120, sensors 230, ECUs 240, and other devices or systems connected to the vehicle data bus 250. In some examples, vehicle data bus 250 may be implemented in accordance with the controller area network (CAN) bus protocol as defined by International Standards Organization (ISO) 11898-1. Alternatively, in some examples, vehicle data bus 240 may be a Media Oriented Systems Transport (MOST) bus, or a CAN flexible data (CAN-FD) bus (ISO 11898-7) or a combination of CAN and CAN-FD.

Figure 2B:
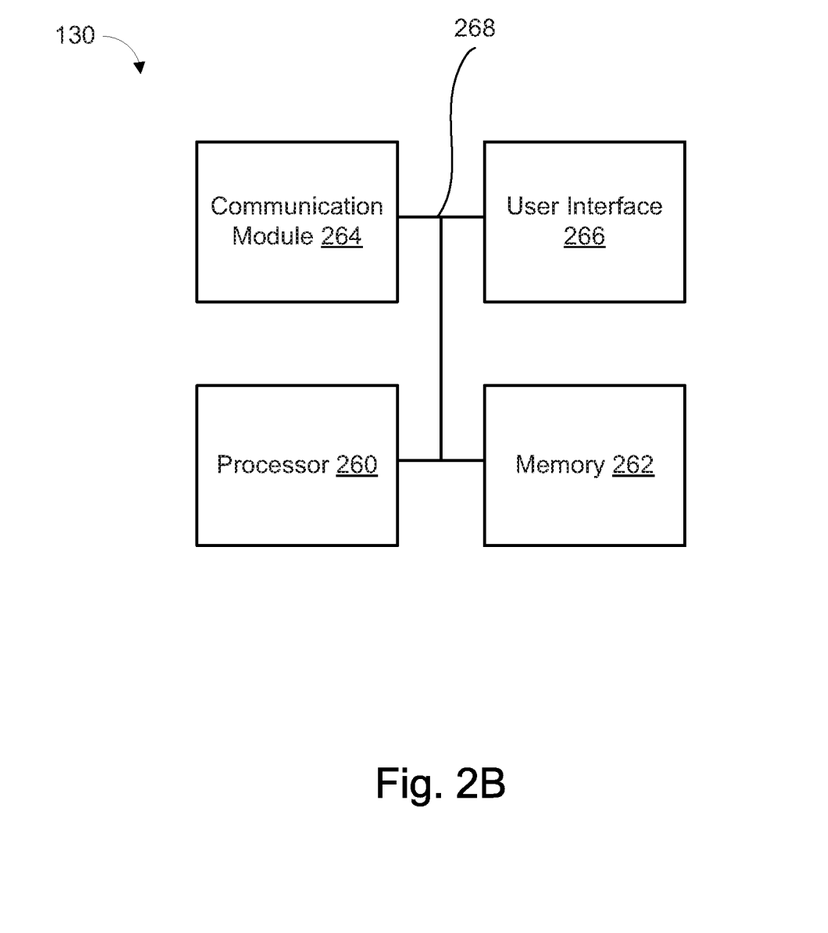
FIG. 2B illustrates a simplified block diagram of the example computing device of FIG. 1

FIG. 2B illustrates a simplified block diagram of an example computing device 130. Computing device 130 may be configured for performing a variety of functions or acts such as those described in this disclosure and the accompanying drawings. Computing device 130 may include various components, including for example, a processor 260, memory 262, communication module 264, and user interface 266, all communicatively coupled by a system bus, network, or other connection mechanism 268.

Processor 260 may include a general purpose processor (e.g., a microprocessor) and/or a special purpose processor (e.g., a digital signal processor (DSP)). Memory 262 may include one or more volatile (e.g., random access memory (RAM, such as DRAM, SRAM, SDRAM, etc.)) and non-volatile (e.g., ROM, hard drive, flash drive, CDROM, etc.), removable, and/or non-removable storage components, such as magnetic, optical, or flash storage, and may be integrated in whole or in part with the processor 260. These and other components may reside on devices located elsewhere on a network or in a cloud arrangement. Further, the memory 262 may take the form of a non-transitory computer-readable storage medium, having stored thereon program instructions (e.g., compiled or non-compiled program logic and/or machine code) that, when executed by the processor 260, cause computing device 130 to perform one or more functions or acts, such as those described in this disclosure. Such program instructions may define or be part of a discrete software application that can be executed in response to certain inputs received from the user interface 266 and/or communication module 264, for instance. Memory 262 may also store other types of information or data, such as those types described throughout this disclosure.

Communication module 264 may be configured to allow computing device 130 to communicate with one or more devices (or systems) such as vehicle 100, according to one or more protocols. In some examples, the communication module 264 may be a wireless interface, such as a cellular or Wi-Fi interface. It will be understood, however, that a variety of network protocols could be employed, such as IEEE 802.11 Wi-Fi, address resolution protocol ARP, spanning-tree protocol STP, or fiber-distributed data interface FDDI. It will also be understood that while some embodiments may include computing device 130 having a broadband or wireless connection to the Internet (such as DSL, Cable, Wireless, T-1, T-3, OC3 or satellite, etc.), the principles of the invention are also practicable with a dial-up connection through a standard modem or other connection means. Wireless network connections are also contemplated, such as wireless Ethernet, satellite, infrared, radio frequency, Bluetooth®, near field communication, and cellular networks.

User interface 266 may facilitate interaction with a user of the device, if applicable. As such, user interface 266 may include input components such as a keyboard, a keypad, a mouse, a touch-sensitive panel, a microphone, and a camera, and output components such as a display screen (which, for example, may be combined with a touch-sensitive panel), a sound speaker, and a haptic feedback system. The user interface 266 may also comprise devices that communicate with inputs or outputs, such as a short-range transceiver (RFID, Bluetooth®, etc.), a telephonic interface, a cellular communication port, a router, or other types of network communication equipment. The user interface 266 may be internal to the computing device 130, or may be external and connected wirelessly or via connection cable, such as through a universal serial bus port.

Figure 3:
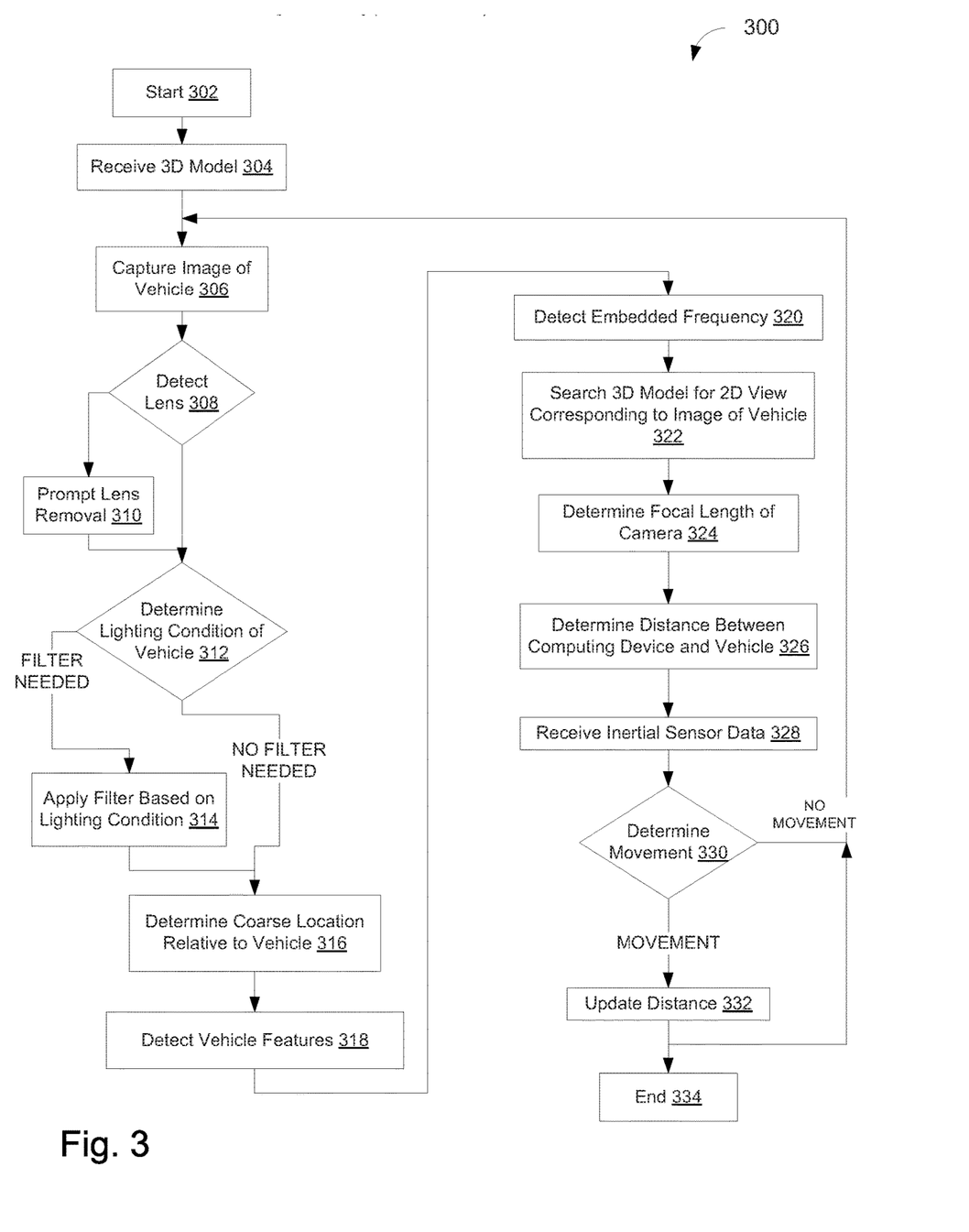
FIG. 3 illustrates a flowchart of an example method according to embodiments of the present disclosure.

FIG. 3 illustrates a flowchart of an example method 300 according to embodiments of the present disclosure. Method 300 may enable one or more systems or devices to accurately determine a distance between a vehicle and a computing device when the vehicle is operating in a remote parking mode.

The flowchart of FIG. 3 is representative of machine readable instructions that are stored in memory (such as memory 212 and/or 262) and may include one or more programs which, when executed by a processor (such as processor 210 and/or 260) may cause vehicle 100 and/or computing device 130 to carry out one or more functions described herein. While the example program is described with reference to the flowchart illustrated in FIG. 3, many other methods for carrying out the functions described herein may alternatively be used. For example, the order of execution of the blocks may be rearranged or performed in series or parallel with each other, blocks may be changed, eliminated, and/or combined to perform method 300. Further, because method 300 is disclosed in connection with the components of FIGS. 1-2, some functions of those components will not be described in detail below.

Method 300 may start at block 302. At block 304, method 300 may include receiving a 3D model of a vehicle such as vehicle 100. The 3D model may be a feature map, a contour map, a surface map, or any other type of model of vehicle 100. In some examples, the 3D model may include size information related to various features, contours, patterns, and other aspects of vehicle 100. In some examples, the size information may correspond to a distance, such that when an image of a vehicle is compared to the 3D model, resizing the 3D model and/or image to match each other may provide a corresponding distance between the camera that captured the image and the vehicle. For instance, a standard or default 3D model may have a particular feature that is one meter long, corresponding to a particular number of pixels when viewed from a distance of five meters. If the captured image includes the feature taking up a greater number of pixels, the 3D model may be expanded or the image may be shrunk. The corresponding distance may also be change based on the amount of change in the model and/or image (i.e., from five meters to four meters).

In some examples, the 3D model may be transmitted from vehicle 100 to computing device 130. The 3D model may be transmitted at the time the computing device is first connected to the vehicle. Or alternatively, the 3D model may be transmitted when the computing device 130 is first used to perform a remote parking assist maneuver.

The 3D model may alternatively be transmitted to computing device 130 from a remote server, via an internet connection for example. Further, the 3D model may be updated or modified over time based on new features or changes to vehicle 100, such as from aftermarket kit installation.

At block 306, method 300 may include capturing an image of the vehicle. The image may be captured by a camera of computing device 130. In some examples, a plurality of images may be captured, and method 300 may be performed based on one or more of the captured images, such that method 300 makes use of continuously updated images, or images updated at regular or irregular intervals.

At block 308, method 300 may include detecting whether a lens is present on computing device 130. The lens may be an aftermarket component of computing device 130, and may affect the focal length of the camera. This may in turn impact a determination of a distance between the computing device 130 and the vehicle 100.

The presence of a lens may be detected by analyzing one or more images captured by the camera. For instance, computing device 130 may capture video of vehicle 100, which may be processed to determine a vehicle speed. Vehicle 100 may also calculate its own velocity using one or more sensors such as inertial sensors 110, and may transmit this information to computing device 130. Computing device 130 may then compare the two calculated speeds to determine whether they match or are within a threshold. If the two determined speeds are different by a threshold amount, computing device 130 may determine that there is a lens present on the camera.

If a lens is detected, computing device 130 may prompt a user to remove the lens. This may take the form of a visual cue or message, or a beep, haptic output, or other output. Alternatively, if a lens is detected, rather than prompting the removal of the lens, computing device 130 may alter one or more algorithms or processes that make use of the determined focal length in order to compensate for the presence of the lens.

At block 312, method 300 may include determining a lighting condition of the vehicle. This determination may be based on the captured image, and may include determining that there are shadows, bright spots, or other abnormal aspects of the image.

In some examples, the lighting condition may be based on the current weather, the position of the sun, and/or the position of one or more vehicles or structures nearby the vehicle 100. Computing device 130 may receive GPS data or weather data, and determine the lighting condition based on this data. Further, computing device 130 may determine the lighting condition based on the time of day, such as by determining that the sun is setting and casting a shadow. Computing device 130 may further make use of longitude and latitude information in determining the lighting condition.

Block 314 of method 300 may include applying a filter based on the determined lighting condition. The filter may be applied to the image, to the 3D model, or to both. One purpose of applying the filter may be to attempt to alter the 3D model and/or captured image such that they are as similar as possible. This may enable computing device 130 to achieve a high threshold of matching. As such, applying the filter may include adding a light source in the 3D model to match the light source in the image, moving the position of a light source in the 3D model, or otherwise changing one or more lighting conditions in the 3D model. Further, applying a filter to the captured image may include performing one or more image processing techniques to remove or account for abnormalities, shadows, additional lights, etc.

At block 316, method 300 may include determining a coarse location of computing device 130 relative to vehicle 100. The coarse location may be used to narrow down possible views of 3D model to search.

The coarse location may include a coarse relative location, such as an indication that computing device 130 is north, south, east, or west of vehicle 100. The coarse location may be more detailed as well. Further, the coarse location can include altitude information, such as an angle above or below the vehicle 100.

In some examples, the coarse location may be determined based on one or more sensors of vehicle 100 or computing device 130. For instance, vehicle 100 may include one or more Bluetooth® antennas, which may be able to detect a rough position of computing device 130 using received signal strength (RSS) values. Other techniques are possible as well.

Block 318 of method 300 may include detecting one or more vehicle features in the captured image. These features may include vehicle lights, the sizing of various elements of vehicle 100, reflective patches, windows, tires etc. These features may aid in determining a match between the image and the 3D model.

Block 320 of method 300 may include detecting an embedded frequency. Some examples may include turning on the vehicle lights 102 while performing the remote parking assist maneuver. The lights 102 may be configured to flash at a particular frequency, or with a particular pattern that can be detected by computing device 130. Detecting the embedded frequency may be done by analyzing several images of vehicle, or may be detected by one or more other sensors of computing device 130.

At block 322, method 300 may include searching the 3D model for a 2D view corresponding to the image of the vehicle. This may include comparing the captured image to each view of the 3D model until there is a match with above a threshold confidence.

In some examples, additional information may be used to narrow the possible views of the 3D model that must be searched. For instance, the lighting conditions and/or filters may be used to narrow the 3D model search. In addition, the field of search may be narrowed based on the determined coarse location or coarse relative location of the computing device 130, based on the determined features in the image (e.g., a license plate in the image may narrow the search to views of the 3D model including the back), or based on one or more embedded features.

Searching the 3D model may also include resizing the 3D model and/or captured image so that one or more corresponding features match in size. This can include determining a confidence score or threshold that must be met for a match to be determined.

At block 324, method 300 may include determining a focal length of the camera of the computing device. The focal length may be used to determine a size, ratio, or other characteristic associated with one or more features of vehicle 100. For instance, the focal length may inform the computing device how many pixels a particular feature should be when captured at a particular distance. Should the feature be more or less pixels, the distance can be adjusted to compensate, based on the focal length remaining constant.

Block 326 of method 300 may include determining a distance between the computing device 130 and the vehicle 100. The distance may be determined based on the focal length, the lighting conditions, filters, coarse location, embedded frequency, and/or any other characteristics of vehicle 100 and/or computing device 130.

Further, the distance may depend on or be correlated with a resizing of the image and/or 3D model. For instance, the 3D model may have a default size, such that any 2D image that matches a view of the 3D model is a known distance from the vehicle. But during execution of block 322, one or both of the 3D model and image may be resized to increase the match confidence. This resizing may have a corresponding change in the distance, such that the distance is still known.

At block 328, method 300 may include receiving inertial sensor data, such as from inertial sensors 110. The inertial sensors may be configured to measure one or more aspects of the vehicle, such as a speed, distance moved, and heading. The sensor data may be processed by vehicle 100 and/or computing device 130 to determine a change in the position of the vehicle.

Computing device 130 may also be configured to determine a change in the position of computing device 130. This may be done using one or more sensors, such as accelerometers, gyroscopes, or other computing device sensors.

Block 330 may include determining whether there has been movement of vehicle 100. This may be determined based on the inertial sensor data or based on processing and searching additional images captured by computing device 130.

Where there has been movement of vehicle 100 (and/or computing device 130), method 300 may include updating the distance between vehicle 100 and computing device 130 at block 332. Method 300 may then end at block 334.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A system comprising:
a vehicle configured to transmit a 3D model of the vehicle and vehicle inertial data; and
a computing device configured to:
receive the 3D model and the vehicle inertial data,
capture an image of the vehicle;
determine a distance between the computing device and the vehicle based on the image and the 3D model;
update the distance based on the vehicle inertial data;
determine, based on the captured image, that the computing device has a detachable lens based on a difference between a first calculated vehicle speed using the 3D model and a second calculated vehicle speed using the vehicle inertial data; and
display a request to remove the detachable lens.

2. The system of claim 1, wherein the computing device is further configured to:
determine a coarse location of the computing device relative to the vehicle; and
search the 3D model for a two-dimensional view that corresponds to the image based on the coarse location.

3. The system of claim 1, wherein the computing device is further configured to:
determine a focal length of a camera of the computing device; and
determine the distance between the computing device and the vehicle based on the focal length.

4. The system of claim 1, wherein the computing device is further configured to:
determine a lighting condition of the vehicle based on one of GPS data, a time of day, and weather data.

5. A method comprising:
receiving, by a computing device, a 3D model of a vehicle and vehicle inertial data;
capturing an image of the vehicle;
determining a distance between the computing device and the vehicle based on the image and the 3D model;
updating the distance based on the vehicle inertial data;
determining, based on the captured image, that the computing device has a detachable lens based on a difference between a first calculated vehicle speed using the 3D model and a second calculated vehicle speed using the vehicle inertial data; and
displaying a request to remove the detachable lens.

6. The method of claim 5, wherein determining the distance between the computing device and the vehicle comprises:

searching the 3D model for a two-dimensional view that corresponds to the image.

7. The method of claim 6, wherein searching the 3D model comprises:
extracting one or more features from the image of the vehicle; and
searching the 3D model for the one or more features.

8. The method of claim 7, wherein the one or more features comprise vehicle lights.

9. The method of claim 6, further comprising:
determining a coarse location of the computing device relative to the vehicle; and
searching the 3D model based on the coarse location.

10. The method of claim 5, further comprising:
determining a focal length of a camera of the computing device; and
determining the distance between the computing device and the vehicle based on the focal length.

11. The method of claim 5, wherein determining the distance between the computing device and the vehicle further comprises: determining a lighting condition of the vehicle based on one of GPS data, a time of day, and weather data.

12. The method of claim 5, wherein determining that the computing device has a detachable lens comprises:
determining a movement of the vehicle based on a plurality of captured images of the vehicle; and
comparing the movement to the vehicle inertial data.

13. A non-transitory, computer-readable medium having instructions that, when executed, cause performance of a set of acts comprising:
receiving, by a computing device, a 3D model of a vehicle and vehicle inertial data;
capturing an image of the vehicle;
determining a distance between the computing device and the vehicle based the image and the 3D model;
updating the distance based on the vehicle inertial data;
determining, based on the captured image, that the computing device has a detachable lens based on a difference between a first calculated vehicle speed using the 3D model and a second calculated vehicle speed using the vehicle inertial data; and
displaying a request to remove the detachable lens.

14. The non-transitory, computer-readable medium of claim 13, the set of acts further comprising:
determining a coarse location of the computing device relative to the vehicle; and
searching the 3D model for a two-dimensional view that corresponds to the image based on the coarse location.

15. The non-transitory, computer-readable medium of claim 13, the set of acts further comprising:
determining a focal length of a camera of the computing device; and
determining the distance between the computing device and the vehicle based on the focal length.

16. The non-transitory, computer-readable medium of claim 13, the set of acts further comprising:
determining a lighting condition of the vehicle based on one of GPS data, a time of day, and weather data.

17. The system of claim 1, wherein determining the distance between the computing device and the vehicle based on the image and the 3D model comprises matching the image to a two-dimensional view of the 3D model based on an embedded frequency of a light from the vehicle.

18. The system of claim 1, wherein the computing device is further configured to:
apply a filter to the 3D model based on a lighting condition of the vehicle, wherein the filter is configured to add a first light source or move a position of the first light source in the 3D model to match a second light source in the image.

19. The method of claim 5, further comprising:
applying a filter to the 3D model based on a lighting condition of the vehicle, wherein the filter is configured to add a first light source or move a position of the first light source in the 3D model to match a second light source in the image.

20. The non-transitory, computer-readable medium of claim 13, the set of acts further comprising:
applying a filter to the 3D model based on a lighting condition of the vehicle, wherein the filter is configured to add a first light source or move a position of the first light source in the 3D model to match a second light source in the image.

21. The system of claim 1, wherein the computing device is configured to receive the 3D model from the vehicle, or a cloud storage device.

* * * * *